(12) United States Patent
Sasaki et al.

(10) Patent No.: US 10,551,188 B2
(45) Date of Patent: Feb. 4, 2020

(54) THREE-DIMENSIONAL SURVEYING DEVICE AND THREE-DIMENSIONAL SURVEYING METHOD

(71) Applicant: TOPCON CORPORATION, Itabashi-ku, Tokyo (JP)

(72) Inventors: You Sasaki, Tokyo (JP); Kazunori Sato, Tokyo (JP)

(73) Assignee: TOPCON CORPORATION, Itabashi-ku, Tokyo (JP)

( * ) Notice: Subject to any disclaimer, the term of this patent is extended or adjusted under 35 U.S.C. 154(b) by 0 days.

(21) Appl. No.: 16/244,244

(22) Filed: Jan. 10, 2019

(65) Prior Publication Data
US 2019/0219393 A1     Jul. 18, 2019

(30) Foreign Application Priority Data
Jan. 12, 2018   (JP) .................................. 2018-003788

(51) Int. Cl.
| | |
|---|---|
| *G01C 11/02* | (2006.01) |
| *G01C 11/06* | (2006.01) |
| *G06T 7/00* | (2017.01) |
| *G06T 7/70* | (2017.01) |

(52) U.S. Cl.
CPC ............ *G01C 11/025* (2013.01); *G01C 11/06* (2013.01); *G06T 7/70* (2017.01); *G06T 7/97* (2017.01); *G06T 2207/10032* (2013.01)

(58) Field of Classification Search
None
See application file for complete search history.

(56) References Cited

FOREIGN PATENT DOCUMENTS

| | | |
|---|---|---|
| JP | 2017-020972 A | 1/2017 |
| JP | 2017020972 A * | 1/2017 |

* cited by examiner

*Primary Examiner* — Christopher Braniff
(74) *Attorney, Agent, or Firm* — Chiesa Shahinian & Giantomasi PC

(57) ABSTRACT

Providing a three-dimensional surveying device and method capable of stably acquiring three-dimensional data with high accuracy. The device includes a mobile body, a measurement target, a collimation distance measuring unit fixed to the mobile body, a scanner unit, and a control computation section. The scanner unit is provided integrally and rotatably with respect to the collimation distance measuring unit. The control computation section is configured to calculate a coordinate value of a measurement center of the collimation distance measuring unit based on a distance measured by the collimation distance measuring unit, a first horizontal and first vertical angle, and to calculate a coordinate value of a measurement target object based on the coordinate value of the measurement center, an external orientation element of the scanner unit with respect to the collimation distance measuring unit, a distance measured by the scanner unit and a second horizontal and second vertical angle.

4 Claims, 4 Drawing Sheets

THREE-DIMENSIONAL SURVEYING DEVICE AND THREE-DIMENSIONAL SURVEYING METHOD

CROSS-REFERENCE TO RELATED APPLICATION

This application claims priority to Japanese Patent Application No. 2018-003788, filed on Jan. 12, 2018, the entire disclosure of which is incorporated by reference herein.

TECHNICAL FIELD

The present invention relates to a three-dimensional surveying device and a three-dimensional surveying method configured to acquire three-dimensional data of a measurement target object.

BACKGROUND

Three-dimensional surveying devices mounted on mobile bodies such as vehicles, for example, acquire three-dimensional data for a measurement target object such as a tunnel. Such three-dimensional surveying devices acquire position information and attitude information for a vehicle by using, for example, a total station or a Global Positioning System (GPS) configured to perform distance measuring and angle measuring, and calculate three-dimensional data for the measurement target object. There is a problem, however, that the GPS cannot be used when the vehicle is traveling in a place where it is difficult for radio waves to reach, such as in a tunnel.

In view of this, JP 2017-20972 (A) discloses a three-dimensional shape measurement device including a distance information acquisition section attached to a mobile body, a position information acquisition section configured to acquire position information for the distance information acquisition section, an inertia information acquisition section configured to acquire first attitude information for the distance information acquisition section, an image information acquisition section configured to image an imaging region, and a calculation section. The calculation section of the three-dimensional shape measurement device described in JP 2017-20972 (A) is configured to calculate absolute position information and absolute attitude information of the distance information acquisition section based on the position information, the first attitude information, and second attitude information for the distance information acquisition section acquired by analyzing a plurality of captured images, and to acquire three-dimensional shape information for a measurement target by performing coordinate conversion on the plurality of pieces of distance information acquired by the distance information acquisition section based on the absolute position information and the absolute attitude information.

SUMMARY

In the three-dimensional shape measurement device described in JP 2017-20972 (A), however, the position information acquisition section is installed at a position separate from the mobile body, and the position acquisition section that serves as the measurement target of the position information acquisition unit is mounted on the mobile body. Also, the position information of the position acquisition section (the measurement target) acquired by the position information acquisition section is transmitted to the calculation unit via a wireless communication modem. As described above, in the three-dimensional shape measurement devices described in JP 2017-20972 (A), various devices are mounted on the mobile body. Then, the position information of the measurement target is transmitted to the calculation section via the wireless communication modem. For this reason, there are problems in which the three-dimensional shape measurement device tends to be large in scale, the setting of the various devices tend to be complicated, and errors tend to occur due to correction between the devices.

The invention has been made to solve the above problems, and it is an object of the invention to provide a three-dimensional surveying device and a three-dimensional surveying method that can achieve a simplified structure and stably acquire three-dimensional data with high accuracy.

According to an aspect of the invention, the above problems are solved by a three-dimensional surveying device configured to acquire three-dimensional data for a measurement target object, the three-dimensional surveying device including a mobile body, a measurement target installed at a known point separate from the mobile body, a collimation distance measuring unit fixed to the mobile body and configured to radiate a first distance measuring light to the measurement target, measure a distance to the measurement target based on a first reflected distance measuring light resulting from the first distance measuring light being reflected by the measurement target and a first internal reference light, and detect a radiation direction of the first distance measuring light, a scanner unit provided integrally with the collimation distance measuring unit and provided rotatably with respect to the collimation distance measuring unit, the scanner unit configured to radiate a second distance measuring light to the measurement target object, measure a distance to the measurement target object based on a second reflected distance measuring light resulting from the second distance measuring light being reflected by the measurement target object and a second internal reference light, and detect a radiation direction of the second distance measuring light, and a control computation section provided in at least one of the collimation distance measuring unit or the scanner unit, wherein the collimation distance measuring unit includes, a telescope section configured to collimate the measurement target and radiate the first distance measuring light, a first horizontal rotational driving section configured to horizontally rotate the telescope section about a vertical axial center, a first horizontal angle detector configured to detect a first horizontal angle of the telescope section, a first vertical rotation driving section configured to vertically rotate the telescope section about a horizontal axial center, and a first vertical angle detector configured to detect a first vertical angle of the telescope section, the scanner unit includes, a scanning mirror configured to perform rotational radiation of the second distance measuring light within a plane intersecting a horizontal axial center, a second horizontal rotational driving section configured to horizontally rotate the scanning mirror about a vertical axial center, a second horizontal angle detector configured to detect a second horizontal angle of the scanning mirror, a second vertical rotation driving section configured to vertically rotate the scanning mirror about a horizontal axial center, and a second vertical angle detector configured to detect a second vertical angle of the scanning mirror, the control computation section includes, a first distance measurement section configured to measure a distance from the collimation distance measuring unit to the measurement target, and a second distance measurement section configured to measure a distance from the scanner unit to the measurement target object, and the control computation section is configured to, calculate a coordinate value of a measurement center of the collimation distance measuring unit based on the distance measured by the first distance measurement section, the first horizontal angle detected by the first horizontal angle detector, and the first vertical angle detected by the first vertical angle detector, and calculate a coordinate value of the measurement target object based on the coordinate value of the measurement center, an external orientation element of the scanner unit with respect to the collimation distance measuring unit, the distance measured by the second distance measurement section, the second horizontal angle detected by the second horizontal angle detector, and the second vertical angle detected by the second vertical angle detector.

According to the above configuration, a collimation distance measuring unit configured to measure the distance to the measurement target and detect a radiation direction of the first distance measuring light is fixed to the mobile body. In addition, a scanner unit configured to measure the distance to the measurement target object and detect a radiation direction of the second distance measuring light is provided integrally with the collimation distance measuring unit and provided rotatably with respect to the collimation distance measuring unit. That is, the collimation distance measuring unit and the scanner unit are integrally fixed to the mobile body, and move together with the mobile body. For this reason, for example, a wireless communication modem or the like configured to wirelessly transmit and receive signals (information) with each other between the collimation distance measuring unit and the scanner unit is unnecessary. In this way, the three-dimensional surveying device of the invention can suppress the number of devices and equipment provided in the three-dimensional surveying device, and can simplify the structure of three-dimensional surveying devices. In addition, it is possible to suppress the complexity of the settings of the devices and equipment provided in the three-dimensional surveying device.

In addition, the control computation section is configured to calculate a coordinate value of the measurement center of the collimation distance measuring unit based on the distance from the collimation distance measuring unit to the measurement target, the first horizontal angle of the telescope section, and the first vertical angle of the telescope section, and to calculate a coordinate value of the measurement target object based on the coordinates of the measurement center, the exterior orientation element of the scanner unit with respect to the collimation distance measuring unit, the distance from the scanner unit to the measurement target object, the second horizontal angle of the scanning mirror, and the second vertical angle of the scanning mirror. Here, the scanner unit is provided integrally with the collimation distance measuring unit, and is provided rotatably with respect to the collimation distance measuring unit. For this reason, even in cases where the attitude of the mobile body changes, the collimation distance measuring unit can more reliably collimate the measurement target and calculate the coordinate value of the measurement center of the collimation distance measuring unit, and the scanner unit can rotate with respect to the collimation distance measuring unit and scan the measurement target object in a desired direction. In this way, the three-dimensional surveying device of the invention suppresses the occurrence of measurement errors, and can stably acquire high-accuracy three-dimensional data.

Preferably, the control computation section is configured to control the second horizontal rotational driving section and the second vertical rotation driving section to cause the second distance measuring light to be rotationally radiated by the scanning mirror within a plane perpendicular to a movement direction of the mobile body.

According to the above configuration, the control computation section controls the second horizontal rotational driving section and the second vertical rotation driving section such that the scanning mirror rotationally radiates the second distance measuring light within a plane perpendicular to the movement direction of the mobile body. For this reason, in cases where the measurement target object has a shape or structure that extends in the longitudinal direction, such as a tunnel, for example, the scanner unit rotationally radiates the second distance measuring light in a plane perpendicular to the longitudinal direction (the movement direction of the mobile body) and can stably acquire three-dimensional data with high accuracy.

Preferably, the mobile body includes an azimuth sensor configured to detect an azimuth, the collimation distance measuring unit includes an inclinometer configured to measure an inclination with respect to gravity, and the control computation section is configured to calculate the coordinate value of the measurement center further based on the azimuth detected by the azimuth sensor, an external orientation element of the collimation distance measuring unit with respect to the mobile body, and an inclination angle of the collimation distance measuring unit measured by the inclinometer, and to calculate the coordinate value of the measurement target object further based on the azimuth detected by the azimuth sensor and the inclination angle of the collimation distance measuring unit measured by the inclinometer.

According to the above configuration, the three-dimensional surveying device can acquire coordinate values of the measurement target object in a global coordinate system.

According to an aspect of the invention, the above problems are solved by a three-dimensional surveying method to be executed by a three-dimensional surveying device configured to acquire three-dimensional data for a measurement target object, the three-dimensional surveying method including, calculating a coordinate value of a measurement center of a collimation distance measuring unit fixed to a mobile body based on a distance measured by a first distance measurement unit configured to collimate a measurement target installed at a known point separate from the mobile body and radiate a first distance measuring light to measure a distance to the measurement target, a first horizontal angle of a telescope section in rotating the telescope section horizontally about a vertical axial center, and a first vertical angle of the telescope section in rotating the telescope section vertically about a horizontal axial center, and calculating a coordinate value of the measurement target object based on the coordinate value of the measurement center, an external orientation element of a scanner unit with respect to the collimation distance measuring unit, wherein the scanner unit is provided integrally with the collimation distance measuring unit and provided rotatably with respect to the collimation distance measuring unit, a distance measured by a second distance measurement section configured to radiate a second distance measuring light to measure a distance to the measurement target object, a second horizontal angle of a scanning mirror configured to perform rotational radiation of the second distance measuring light within a plane intersecting a horizontal axial center in rotating the scanning mirror horizontally about a vertical axial center, and a second vertical angle of the scanning mirror in rotating the scanning mirror vertically about a horizontal axial center.

According to the above configuration, the three-dimensional survey method of the invention includes calculating a coordinate value of a measurement center of the collimation distance measuring unit fixed to the mobile body. Here, the coordinate value of the measurement center of the collimation distance measuring unit is calculated based on the distance measured by the first distance measurement unit configured to collimate the measurement target and radiate the first distance measuring light to measure the distance to the measurement target, the first horizontal angle of a telescope section incorporated in the first distance measurement section in rotating the telescope section horizontally about a vertical axial center, and the first vertical angle of the telescope section in rotating the telescope section vertically about a horizontal axial center. In addition, in the three-dimensional surveying method of the invention, the coordinate value of the measurement target object is calculated by a scanner unit that is provided integrally with the collimation distance measuring unit and is provided rotatably with respect to the collimation distance measuring unit. Here, the coordinate value of the measurement target object is calculated based on the coordinate value of the measurement center, an external orientation element of the scanner unit with respect to the collimation distance measuring unit, the distance measured by the second distance measurement section configured to radiate the second distance measuring light to measure the distance to the measurement target object, the second horizontal angle of the scanning mirror configured to perform rotational radiation of the second distance measuring light within a plane intersecting a horizontal axial center in rotating the scanning mirror horizontally about a vertical axial center, and the second vertical angle of the scanning mirror in rotating the scanning mirror vertically about a horizontal axial center. Accordingly to the three-dimensional surveying method of the invention, the collimation distance measuring unit and the scanner unit are integrally fixed to the mobile body, and move together with the mobile body. For this reason, for example, a wireless communication modem or the like configured to wirelessly transmit and receive signals (information) with each other between the collimation distance measuring unit and the scanner unit is unnecessary. In this way, the three-dimensional surveying method of the invention can suppress the number of devices and equipment provided in the three-dimensional surveying device, and can simplify the structure of three-dimensional surveying devices. In addition, it is possible to suppress the complexity of the settings of the devices and equipment provided in the three-dimensional surveying device.

In addition, even in cases where the attitude of the mobile body changes, the collimation distance measuring unit can more reliably collimate the measurement target and calculate the coordinate value of the measurement center of the collimation distance measuring unit, and the scanner unit can rotate with respect to the collimation distance measuring unit and scan the measurement target object in a desired direction. In this way, according to the three-dimensional surveying device of the invention, it is possible to suppress the occurrence of measurement errors, and to stably acquire high-accuracy three-dimensional data.

According to an aspect of the invention, it is possible to provide a three-dimensional surveying device and a three-dimensional surveying method that can achieve a simplified structure and stably acquire three-dimensional data with high accuracy.

DETAILED DESCRIPTION

Figure 1:
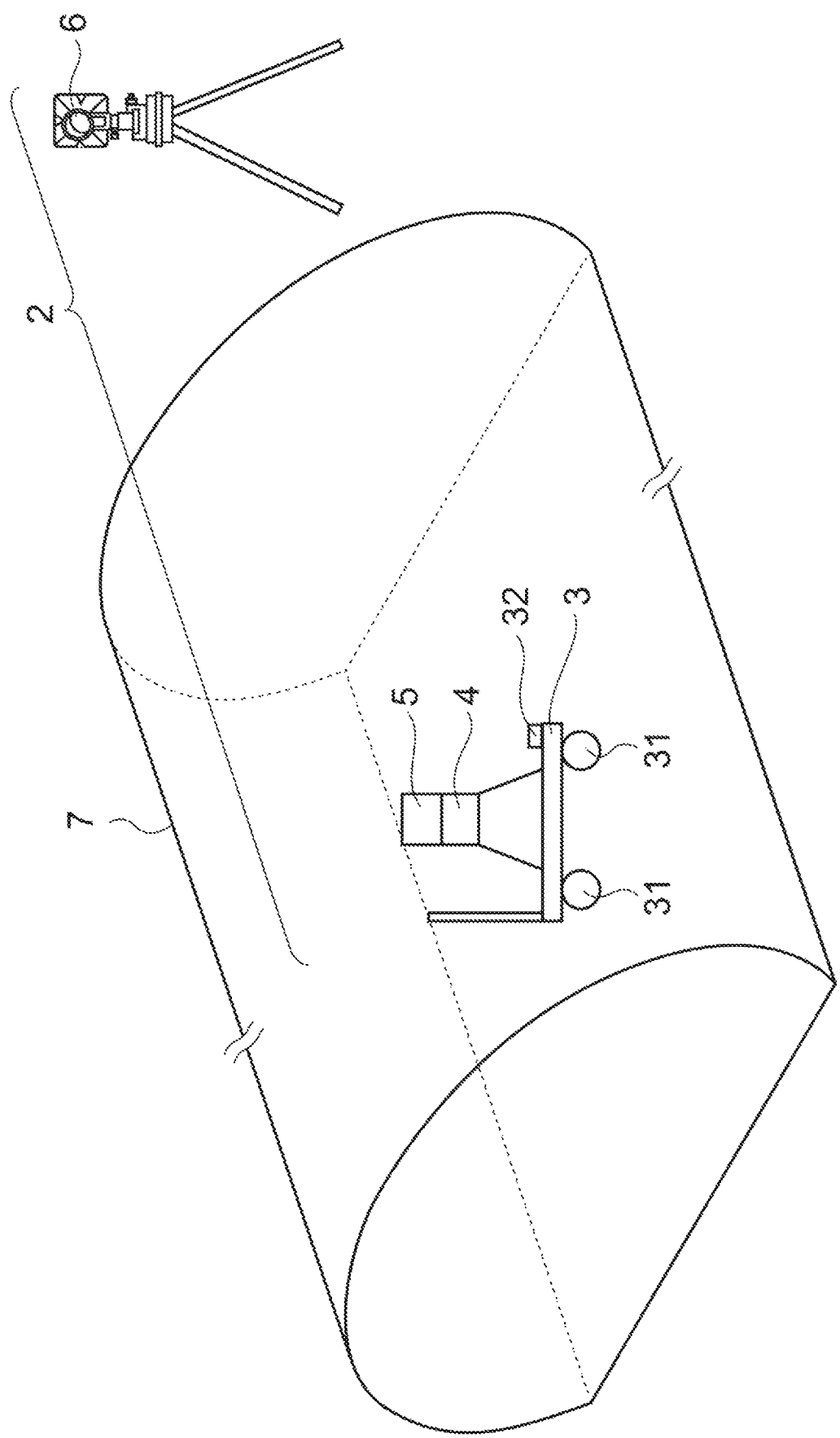
FIG. 1 is a perspective view illustrating a three-dimensional surveying device according to an embodiment of the invention.

Hereinafter, preferred embodiments of the invention will be described in detail with reference to the figures.

It should be noted that, since the embodiments described below are preferred specific examples of the invention, a variety of technically preferable limitations are given, but the scope of the invention is not limited to these aspects unless there is a description made specifically to limit the invention. In addition, in the figures, the same components are denoted by the same reference numerals, and a detailed description thereof will be omitted as appropriate.

FIG. 1 is a perspective view illustrating a three-dimensional surveying device according to an embodiment of the invention.

The three-dimensional surveying device 2 according to the present embodiment includes a mobile body 3, a collimation distance measuring unit 4, a scanner unit 5, and a measurement target 6, and is configured to acquire three-dimensional data of a measurement target object 7 such as a structure or the like. As the measurement target object 7, for example, a tunnel or the like as illustrated in FIG. 1 can be mentioned. However, the measurement target object 7 is not limited to only tunnels.

The mobile body 3 is mounting the collimation distance measuring unit 4 and the scanner unit 5, and is movable. The mobile body 3 includes wheels 31, and functions as a movement vehicle that moves along a measurement target object 7 such as a tunnel in a state in which the collimation distance measuring unit 4 and the scanner unit 5 are mounted. A dolly and an automobile can be mentioned as examples of the mobile body 3. The mobile body 3 includes an azimuth sensor 32. At least one of a gyro sensor, an acceleration sensor, a magnetic compass, and an encoder attached to the wheel 31 can be provided as the azimuth sensor 32. Alternatively, the azimuth sensor 32 may be an Inertial Measurement Unit (IMU) that includes an angular velocity sensor such as a triaxial gyro sensor and a three direction acceleration sensor. Based on the signal (information) transmitted from the azimuth sensor 32 of the mobile body 3, the control computation section 46 (see FIG. 3) can measure the azimuth of the mobile body 3 by dead reckoning or the like.

The collimation distance measuring unit 4 is referred to as a total station, for example, and is fixed to the mobile body 3. The collimation distance measuring unit 4 radiates a first distance measuring light 455 (see FIG. 3) to the measurement target 6, measures the distance to the measurement target 6 based on a first reflected distance measuring light 456 (see FIG. 3) resulting from the first distance measuring light 455 being reflected by the measurement target 6 and the first internal reference light (not illustrated), and detects a radiation direction of the first distance measuring light 455. That is, the collimation distance measuring unit 4 is a device that performs distance measuring and angle measuring. The details of the collimation distance measuring unit 4 will be described later.

The scanner unit 5 is provided integrally with the collimation distance measuring unit 4, and is provided rotatably with respect to the collimation distance measuring unit 4. The scanner unit 5 radiates a second distance measuring light 565 (see FIG. 3) to the measurement target object 7, measures the distance to the measurement target object 7 based on a second reflected distance measuring light 566 (see FIG. 3) resulting from the second distance measuring light 565 being reflected by the measurement target object 7 and a second internal reference light (not illustrated), and detects a radiation direction of the second distance measuring light 565. Similar to the collimation distance measuring unit 4, the scanner unit 5 is a device that performs distance measuring and angle measuring. Details of the scanner unit 5 will be described later.

The measurement target 6 is installed at a known point separate from the mobile body 3. An example of the measurement target 6 includes a prism. The prism used as the measurement target 6 is not particularly limited, and may, for example, be an all-around prism, a spherical prism, a planar prism, or the like. The measurement target 6 may be installed at a known point. In the case that the measurement target object 7 is a structure such as a tunnel, the measurement target 6 may be installed within the structure, or installed outside of the structure.

Figure 2:
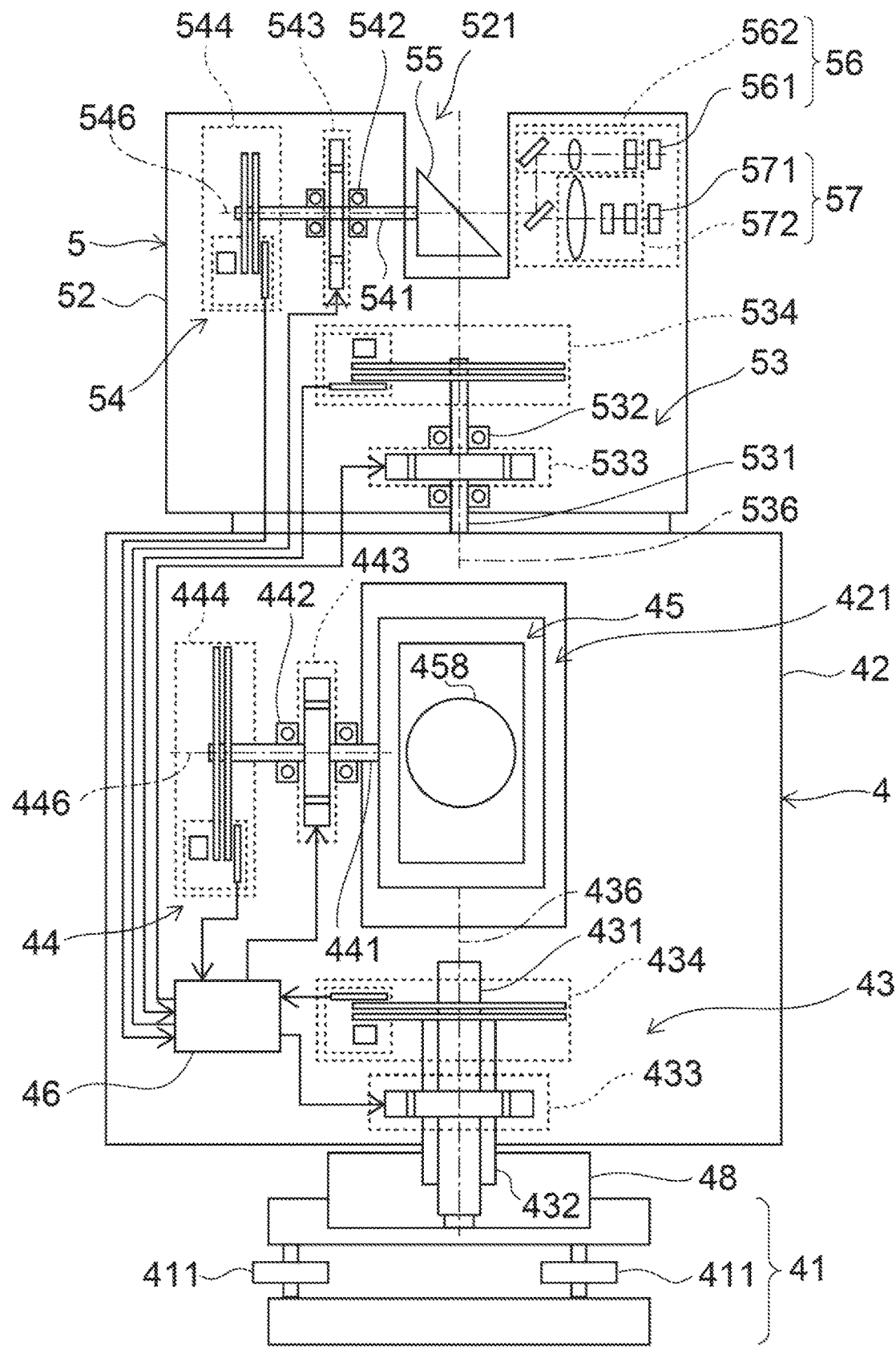
FIG. 2 is a block diagram primarily illustrating a structural system of a collimation distance measuring unit and a scanner unit according to an embodiment of the invention.

FIG. 2 is a block diagram primarily illustrating a structural system of a collimation distance measuring unit and a scanner unit according to the present embodiment.

Figure 3:
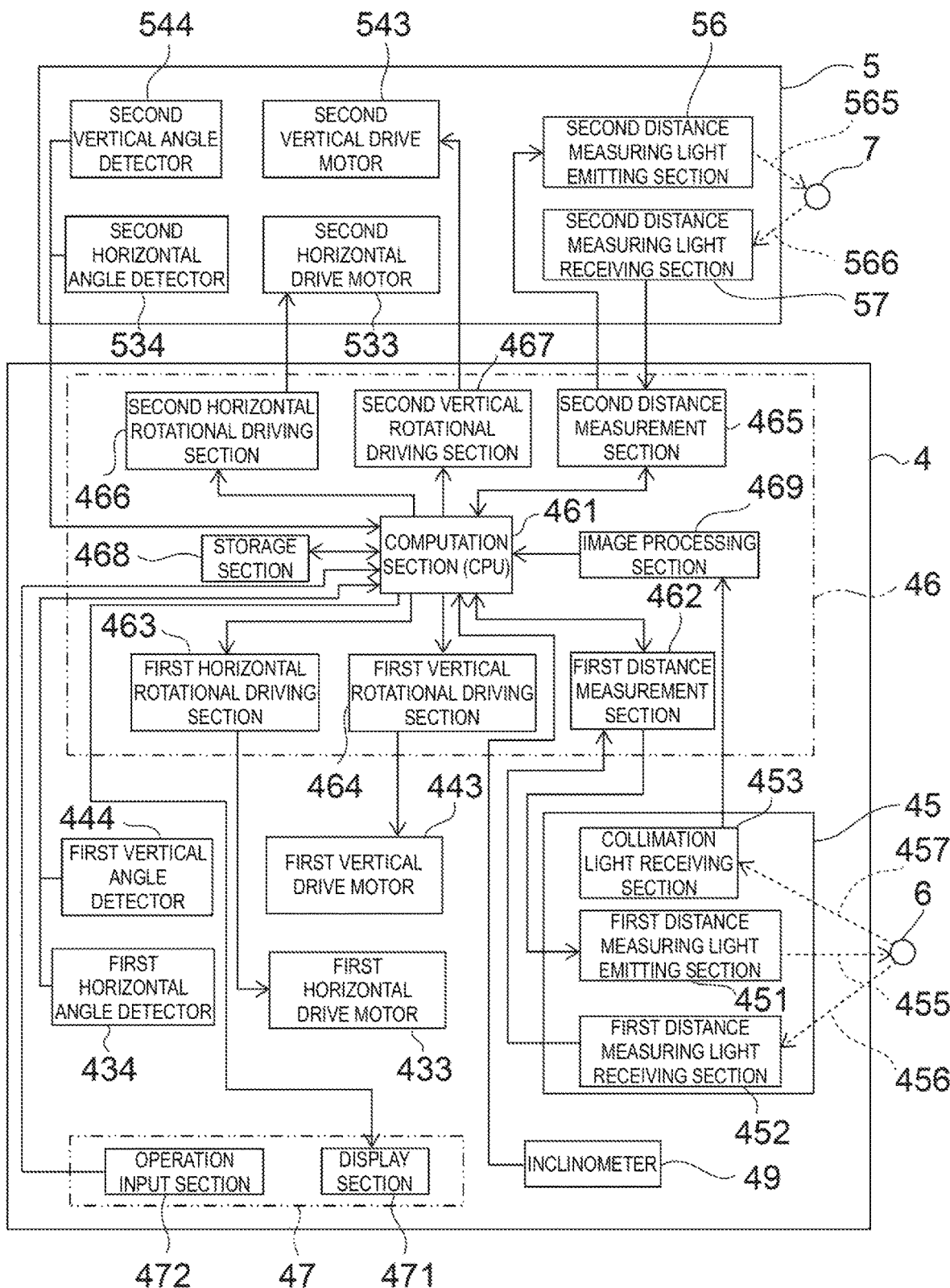
FIG. 3 is a block diagram primarily illustrating a control system of a collimation distance measuring unit and a scanner unit according to an embodiment of the invention.

FIG. 3 is a block diagram primarily illustrating a control system of a collimation distance measuring unit and a scanner unit according to the present embodiment.

The collimation distance measuring unit 4 of the present embodiment includes a leveling section 41, a first mount section 42, a first horizontal rotating section 43, a first vertical rotating section 44, a telescope section 45, a control computation section 46, an operation display section 47, a base section 48, and an inclinometer 49. The collimation distance measuring unit 4 includes an automatic tracking function for automatically searching for the measurement target 6. The external orientation element of the collimation distance measuring unit 4 with respect to the mobile body 3 is preset and known.

The control computation section 46 includes a computation section 461, a first distance measurement section 462, a first horizontal rotational driving section 463, a first vertical rotational driving section 464, a second distance measurement section 465, a second horizontal rotational driving section 466, a second vertical rotation driving section 467, a storage section 468, and an image processing section 469. The computation section 461 is, for example, a Central Processing Unit (CPU) or the like, and is configured to execute program activation, signal control processing, computation, drive control of the display unit 471 of the operation display section 47 and the like based on signals (commands) transmitted from the operation input section 472 of the operation display section 47. That is, the computation section 461 controls the entirety of the three-dimensional surveying device 2, and also causes the display unit 471 to display survey conditions, measurement results (distance measuring results and angle measuring results), image processing results (images of collimation ranges), and the like.

The first distance measurement section 462, the first horizontal rotational driving section 463, the first vertical rotational driving section 464, the second distance measurement section 465, the second horizontal rotational driving section 466, the second vertical rotation driving section 467, and the image processing section 469 are implemented by the computation section 461 executing programs stored (retained) in the storage section 468. It should be noted that the first distance measurement section 462, the first horizontal rotational driving section 463, the first vertical rotational driving section 464, the second distance measurement section 465, the second horizontal rotational driving section 466, the second vertical rotation driving section 467, and the image processing section 469 may be implemented by hardware, or alternatively, may be implemented by a combination of hardware and software.

In the storage section 468, for example, a sequence program for measurement, an image processing program for image processing, a computation program and the like are stored. A semiconductor memory incorporated in the three-dimensional surveying device 2 can be used as the storage section 468, for example. Alternatively, various storage media such as Compact Discs (CDs), Digital Versatile Discs (DVDs), Random Access Memory (RAM), hard disks, and memory cards configured to connect to the three-dimensional surveying device 2 can be used as the storage section 468.

The leveling section 41 is a portion to be attached to a tripod (not illustrated), and includes three adjusting screws 411, for example. The leveling of the leveling section 41 is performed by adjusting the adjusting screw 411 such that an inclination sensor (not illustrated) provided on the first mount section 42 detects the horizontal at the known point where the measurement target 6 is installed, for example. That is, the first mount section 42 is maintained horizontally at the known point where the measurement target 6 is installed, for example, by performing leveling with the adjusting screw 411.

The first horizontal rotating section 43 includes a first horizontal rotation shaft 431, a shaft bearing 432, a first horizontal drive motor 433, and a first horizontal angle detector (an encoder, for example) 434. The first horizontal rotation shaft 431 includes a vertically extending first vertical axial center 436, and is rotatably supported by the base section 48 via the shaft bearing 432. The first mount section 42 is supported by the first horizontal rotation shaft 431, and rotates integrally with the first horizontal rotation shaft 431 in the horizontal direction around the first vertical axial center 436 by the driving force transmitted from the first horizontal drive motor 433.

The rotation angle of the first horizontal rotation shaft 431 with respect to the base section 48 (that is, the rotation angle of the first mount section 42) is detected by the first horizontal angle detector 434. The detection result of the first horizontal angle detector 434 (the first horizontal angle) is input to the computation section (CPU) 461. The driving of the first horizontal drive motor 433 is controlled by the first horizontal rotational driving section 463 based on the detection result of the first horizontal angle detector 434. The horizontal angle detected by the first horizontal angle detector 434 corresponds to the "first horizontal angle" of the invention. The first vertical rotating section 44 includes a first vertical rotation shaft 441, a shaft bearing 442, a first vertical drive motor 443, and a first vertical angle detector (an encoder, for example) 444. The first vertical rotation shaft 441 includes a first horizontal axial center 446 extending horizontally, and is rotatably supported by the first mount section 42 via the shaft bearing 442. One end portion of the first vertical rotation shaft 441 protrudes into the gap section 421 of the first mount section 42. The telescope section 45 is supported by one end portion of the first vertical rotation shaft 441 that protrudes into the gap section 421 of the first mount section 42, and rotates integrally with the first vertical rotation shaft 441 in the vertical direction around the first horizontal axial center 446 by the driving force transmitted from the first vertical drive motor 443.

The first vertical angle detector 444 is provided at the other end portion of the first vertical rotation shaft 441. The rotation angle of the first vertical rotation shaft 441 with respect to the first mount section 42 (that is, the rotation angle of the telescope section 45) is detected by the first vertical angle detector 444. The detection result of the first vertical angle detector 444 (the first vertical angle) is input to the computation section 461. The driving of the first vertical drive motor 443 is controlled by the first vertical rotational driving section 464 based on the detection result of the first vertical angle detector 444. The vertical angle detected by the first vertical angle detector 444 corresponds to the "first vertical angle" of the invention.

As described above, the telescope section 45 is supported by the first vertical rotation shaft 441, and rotates in the vertical direction around the first horizontal axial center 446 by the driving force transmitted from the first vertical drive motor 443. The telescope section 45 includes a collimator 458, and is configured to collimate the measurement target 6 and radiate the first distance measuring light 455. Explained more particularly, the telescope section 45 includes a first distance measuring light emitting section 451, a first distance measuring light receiving section 452, and a collimation light receiving section 453.

The first distance measuring light emitting section 451 is drive controlled by the first distance measurement section 462. The first distance measuring light emitting section 451 is provided within the telescope section 45, and ejects a first distance measuring light 455, such as a laser light, in a direction orthogonal to the first horizontal axial center 446. The first distance measuring light 455 ejected from the first distance measuring light emitting section 451 is radiated to the measurement target 6. The first reflected distance measuring light 456 reflected by the measurement target 6 is received by the first distance measuring light receiving section 452 provided inside the telescope section 45. The first distance measuring light receiving section 452 converts the light and dark (the received light result) of the received first reflected distance measuring light 456 into an electronic signal (receiving light signal) and transmits the receiving light signal to the first distance measurement section 462. In addition, the first distance measuring light receiving section 452 receives the internal reference light (not illustrated) that was guided from the reference light optical unit (not illustrated), converts it into an electric signal, and transmits it to the first distance measurement section 462.

The first distance measurement section 462 computes the distance to the measurement target 6 based on the light receiving signal transmitted from the first distance measuring light receiving section 452. That is, the first reflected distance measuring light 456 and the internal reference light are respectively converted into a first reflected distance measuring light electric signal and an internal reference light electric signal, and these signals are sent to the first distance measurement section 462. The distance to the measurement target 6 is measured based on the difference in the time interval between the first reflected distance measuring light electric signal and the internal reference light electric signal. The computation result of the first distance measurement section 462 is input to the computation section 461.

Based on the measured distance to the measurement target 6, the vertical angle detected by the first vertical angle detector 444, and the horizontal angle detected by the first horizontal angle detector 434, the computation section 461 calculates the coordinate value of the measurement target 6. Put differently, since the measurement target 6 is installed at a known point separate from the mobile body 3, the computation section 461 calculates the coordinate value of the measurement center of the collimation distance measuring unit 4 based on the measured distance to the measurement target 6, the vertical angle detected by the first vertical angle detector 444, and the horizontal angle detected by the first horizontal angle detector 434.

The collimation light receiving section 453 is an image sensor such as a Charge Coupled Device (CCD) or a Complementary Metal Oxide Semiconductor (CMOS), for example, and receives reflected collimation light 457 in a wavelength range that differs from the wavelength range of the first reflected distance measuring light 456. The reflected collimation light 457 is light having a wavelength range that differs from the wavelength range of the first reflected distance measuring light 456, and is light reflected by the measurement target 6. That is, the collimation light receiving section 453 receives the reflected collimation light 457 reflected by the measurement target 6, and receives an image of the measurement target 6. Natural light, infrared light and the like can be mentioned as examples of the reflected collimation light 457. However, the reflected collimation light 457 is not limited to this. The reflected collimation light 457 is received by the collimation light receiving section 453 provided inside the telescope section 45. The collimation light receiving section 453 converts the light and dark (the received light result) of the reflected collimation light 457 into an electronic signal (image signal), and transmits the image signal to the image processing section 469.

The image processing section 469 executes image processing of the image signal transmitted from the collimation light receiving section 453 and transmits it to the computation section 461 as an image data signal. The computation section 461 executes computation based on the image data signal transmitted from the image processing section 469, and performs control to display the image in the collimation range from the telescope section 45 on the display unit 471 of the operation display section 47.

The inclinometer 49 measures the inclination (inclination angle) of the collimation distance measuring unit 4 with respect to gravity. The measurement result of the inclinometer 49 is input to the computation section 461.

The scanner unit 5 of the present embodiment includes a second mount section 52, a second horizontal rotating section 53, a second vertical rotating section 54, a scanning mirror 55, a second distance measuring light emitting section 56, and a second distance measuring light receiving section 57. The exterior orientation element of the scanner unit 5 with respect to the collimation distance measuring unit 4 is preset and known.

The second horizontal rotating section 53 includes a second horizontal rotation shaft 531, a shaft bearing 532, a second horizontal drive motor 533, and a second horizontal angle detector (for example, an encoder) 534. The second horizontal rotation shaft 531 includes a vertically extending second vertical axial center 536, and is rotatably supported by the second mount section 52 via a shaft bearing 532. One end portion of the second horizontal rotation shaft 531 is connected to the first mount section 42 of the collimation distance measuring unit 4. The second mount section 52 is supported by the second horizontal rotation shaft 531, and rotates integrally with the second horizontal rotation shaft 531 in the horizontal direction around the second vertical axial center 536 by the driving force transmitted from the second horizontal drive motor 533.

The second vertical axial center 536 is parallel to the first vertical axial center 436. In the three-dimensional surveying device 2 according to the present embodiment, the first vertical axial center 436 and the second vertical axial center 536 are on the same straight line. However, the first vertical axial center 436 and the second vertical axial center 536 are not limited to being on the same line. The distance between the first vertical axial center 436 and the second vertical axial center 536 is known. That is, the position of the second vertical axial center 536 with respect to the first vertical axial center 436 is known.

The second horizontal angle detector 534 is provided at the other end of the second horizontal rotation shaft 531. The rotation angle of the second horizontal rotation shaft 531 with respect to the first mount section 42 (that is, the rotation angle of the second mount section 52) is detected by the second horizontal angle detector 534. The detection result of the second horizontal angle detector 534 (the second horizontal angle) is input to the computation section 461. The driving of the second horizontal drive motor 533 is controlled by the second horizontal rotational driving section 466 based on the detection result of the second horizontal angle detector 534. The horizontal angle detected by the second horizontal angle detector 534 corresponds to the "second horizontal angle" of the invention.

The second vertical rotating section 54 includes a second vertical rotation shaft 541, a shaft bearing 542, a second vertical drive motor 543, and a second vertical angle detector (an encoder, for example) 544. The second vertical rotation shaft 541 includes a horizontally extending second horizontal axial center 546, and is rotatably supported by the second mount section 52 via the shaft bearing 542. One end portion of the second vertical rotation shaft 541 protrudes into the recess portion 521 of the second mount section 52. The scanning mirror 55 is supported by one end portion of the second vertical rotation shaft 541 that protrudes into the recess portion 521 of the second mount section 52, and rotates integrally with the second vertical rotation shaft 541 in the vertical direction around the second horizontal axial center 546 by the driving force transmitted from the second vertical drive motor 543.

The second vertical angle detector 544 is provided at the other end portion of the second vertical rotation shaft 541. The rotation angle of the second vertical rotation shaft 541 with respect to the second mount section 52 (that is, the rotation angle of the scanning mirror 55) is detected by the second vertical angle detector 544. The detection result of the second vertical angle detector 544 (the second vertical angle) is input to the computation section 461. The driving of the second vertical drive motor 543 is controlled by the second vertical rotational driving section 467 based on the detection result of the second vertical angle detector 544. The vertical angle detected by the second vertical angle detector 544 corresponds to the "second vertical angle" of the invention.

The second horizontal axial center 546 is parallel to the first horizontal axial center 446. The distance between the first horizontal axial center 446 and the second horizontal axial center 546 is known. That is, the position of the second horizontal axial center 546 with respect to the first horizontal axial center 446 is known.

The scanning mirror 55 is a deflecting optical member, and it reflects the second distance measuring light 565 incident from the horizontal direction at a right angle. That is, the scanning mirror 55 reflects the second distance measuring light 565, incident from the horizontal direction, in a direction orthogonal to the second horizontal axial center 546. As described above, the scanning mirror 55 is supported by the second vertical rotation shaft 541, and rotates in the vertical direction around the second horizontal axial center 546 by the driving force transmitted from the second vertical drive motor 543. In this way, the scanning mirror 55 performs rotational radiation of the second distance measuring light 565 in a plane that intersects (in particular, that is orthogonal to) the second horizontal axial center 546. In addition, the scanning mirror 55 reflects the second reflected distance measuring light 566, being reflected by the measurement target object 7 and incident on the scanning mirror 55, toward the second distance measuring light receiving section 57. That is, the scanning mirror 55 reflects the second reflected distance measuring light 566, being reflected by the measurement target object 7 and incident on the scanning mirror 55, in a direction parallel to the second horizontal axial center 546.

As illustrated in FIG. 2, the second distance measuring light emitting section 56 includes a light emitting element 561 and a projection light optical section 562 including an object lens or the like, and is controlled by a second distance measurement section 465. The light emitting element 561 is, for example, a semiconductor laser or the like, and ejects, via the projection light optical section 562, the first distance measuring light 565 on an optical axis that coincides with the second horizontal axial center 546. The first distance measuring light 565 is a pulse laser beam of infrared light as invisible light. The light emitting element 561 is controlled by the second distance measurement section 465 to emit pulsed light in a specific state that includes a specific light intensity, a specific pulse interval, and the like.

As illustrated in FIG. 2, the second distance measuring light receiving section 57 includes a light receiving element 571 and a receiving light optical section 572 that includes a condensing lens or the like. The light receiving element 571 receives the second reflected distance measuring light 566 that results from the second distance measuring light 565 being reflected by the measurement target object 7 and that was reflected by the scanning mirror 55 and transmitted through the receiving light optical section 572. The light receiving element 571 converts the light and dark (the received light result) of the received second reflected distance measuring light 566 into an electronic signal (receiving light signal), and transmits the receiving light signal to the second distance measurement section 465. In addition, the light receiving element 571 receives the internal reference light (not illustrated) that was guided from the reference light optical unit (not illustrated), converts it into an electric signal, and transmits it to the second distance measurement section 465.

The second distance measurement section 465 computes the distance to the measurement target object 7 based on the light receiving signal transmitted from the second distance measuring receiving section 57 (in particular, the light receiving element 571). That is, the second reflected distance measuring light 566 and the internal reference light are respectively converted into a second reflected distance measuring light electric signal and an internal reference light electric signal, and these signals are sent to the second distance measurement section 465. The distance to the measurement target object 7 is measured based on the difference in the time interval between the second reflected distance measuring light electric signal and the internal reference light electric signal. The computation result of the second distance measurement section 465 is input to the computation section 461.

Based on the measured distance to the measurement target object 7, the vertical angle detected by the second vertical angle detector 544, and the horizontal angle detected by the second horizontal angle detector 534, the computation section 461 calculates the coordinate value of the measurement target object 7. In addition, by recording the coordinate values of the measurement target object 7 for each pulsed light, the computation section 461 can obtain point group data on the entire measurement range, or alternatively, point group data regarding the measurement target object 7.

Next, the operation of the three-dimensional surveying device 2 according to the present embodiment and the three-dimensional surveying method executed by the three-dimensional surveying device 2 according to the present embodiment will be described with reference to the figures.

Figure 4:
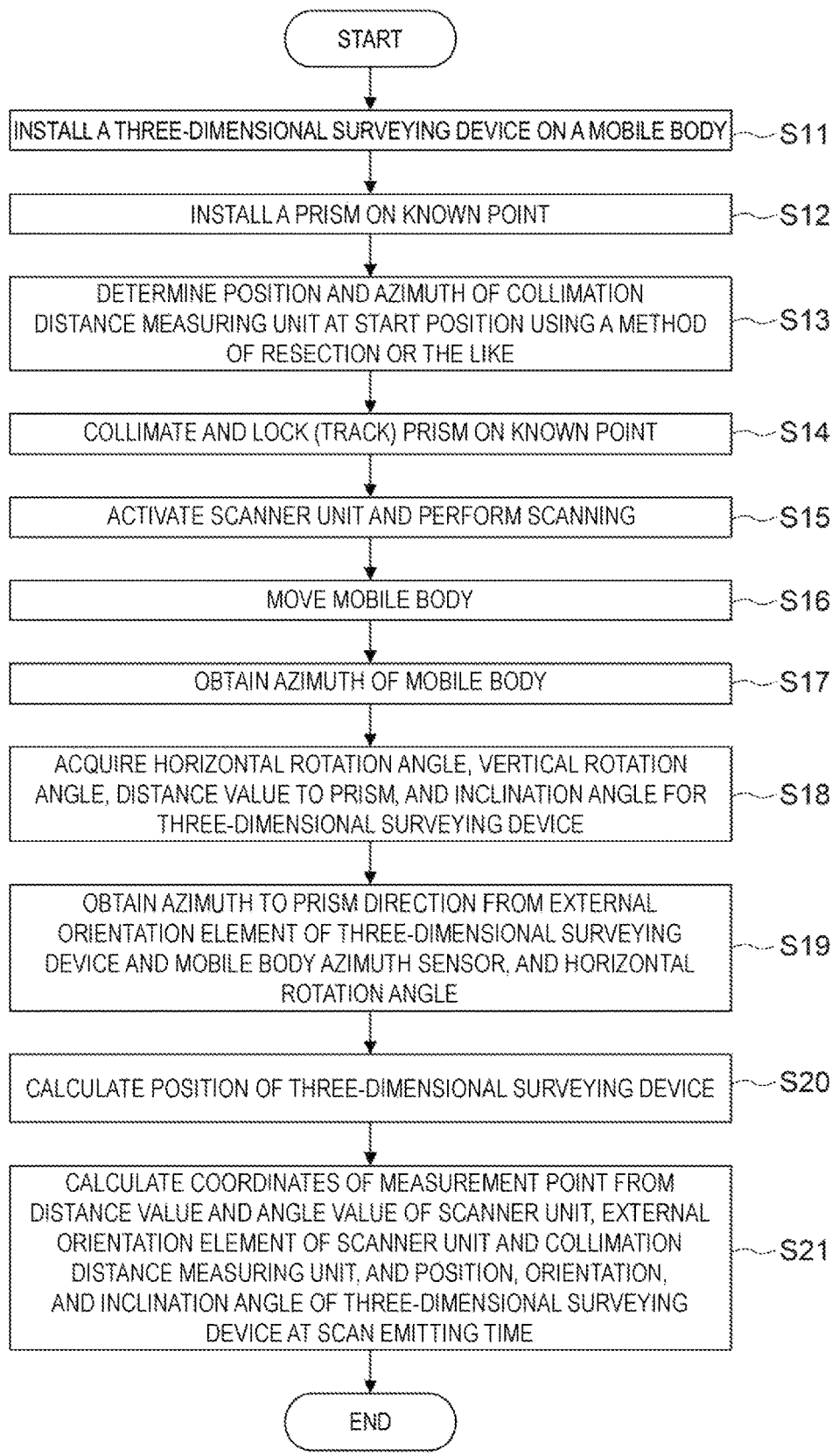
FIG. 4 is a flowchart illustrating a three-dimensional surveying method according to an embodiment of the invention.

FIG. 4 is a flowchart illustrating a three-dimensional surveying method according to an embodiment of the invention.

First, in Step S11, an operator installs and fixes the collimation distance measuring unit 4 and the scanner unit 5 on the mobile body 3. At this time, the exterior orientation element of the collimation distance measuring unit 4 with respect to the mobile body 3 is preset and known. In addition, as was described above with reference to FIG. 1, the scanner unit 5 is provided integrally with the collimation distance measuring unit 4, and is provided rotatably with respect to the collimation distance measuring unit 4. At this time, the exterior orientation element of the scanner unit 5 with respect to the collimation distance measuring unit 4 is preset and known.

Subsequently, in Step S12, the operator installs the measurement target 6 (a prism in FIG. 4) on the known point. The known point is a position separate from the mobile body 3, and may be installed inside a structure (for example, a tunnel), or may be installed outside the structure.

Subsequently, in Step S13, the collimation distance measuring unit 4 determines the position and azimuth of the collimation distance measuring unit 4 at the movement start position (starting position) of the mobile body 3 by a method of resection or the like, for example. That is, the computation section 461 calculates the coordinate value of the measurement center of the collimation distance measuring unit 4 based on the distance from the collimation distance measuring unit 4 to the measurement target 6, the vertical angle detected by the first vertical angle detector 444, and the horizontal angle detected by the first horizontal angle detector 434. In addition, based on the signal transmitted from the azimuth sensor 32 of the mobile body 3, the computation section 461 calculates the azimuth of the mobile body 3 by dead reckoning or the like, and calculates the azimuth of the collimation distance measuring unit 4.

Subsequently, in Step S14, the collimation distance measuring unit 4 collimates and locks (tracks) the measurement target 6 installed on the known point. That is, the collimation distance measuring unit 4 automatically collimates the measurement target 6 using the automatic tracking function of the collimation distance measuring unit 4.

Subsequently, in Step S15, the computation section 461 activates the scanner unit 5, and initiates scanning by the scanner unit 5. That is, the computation section 461 acquires the distance from the scanner unit 5 to the measurement target object 7, the vertical angle detected by the second vertical angle detector 544, and the horizontal angle detected by the second horizontal angle detector 534. At this time, the computation section 461 controls the second horizontal drive motor 533 via the second horizontal rotational driving section 466, controls the second vertical drive motor 543 via the second vertical rotation driving section 467, and performs rotational radiation of the second distance measuring light 565 by the scanning mirror 55 in a plane perpendicular to the movement direction of the mobile body 3. The movement direction of the mobile body 3 is calculated by the computation section 461 based on changes in the azimuth of the mobile body 3 between different arbitrary times, the exterior orientation element of the collimation distance measuring unit 4 with respect to the mobile body 3, and changes in the coordinate values of the measurement center of the collimation distance measuring unit 4 between different arbitrary times.

Subsequently, in Step S16, the operator moves the mobile body 3. For example, the operator grips the handle of the dolly serving as the mobile body 3, and moves the mobile body 3 (the dolly) along a measurement target object 7 such as a tunnel. Alternatively, the operator drives an automobile serving as the mobile body 3, and moves the mobile body 3 (automobile) along a measurement target object 7 such as a tunnel, for example.

Subsequently, in Step S17, the computation section 461 calculates the azimuth of the mobile body 3 by dead reckoning or the like based on the signal transmitted from the azimuth sensor 32 of the mobile body 3.

Subsequently, in Step S18, the computation section 461 acquires the distance from the collimation distance measuring unit 4 to the measurement target 6, the vertical angle detected by the first vertical angle detector 444, and the horizontal angle detected by the first horizontal angle detector 434. At this time, the computation section 461 may calculate the coordinate value of the measurement center of the collimation distance measuring unit 4. At this time, the coordinate value of the measurement center of the collimation distance measuring unit 4 calculated by the computation section 461 is a coordinate value in the local coordinate system. In addition, the computation section 461 acquires the inclination (inclination angle) of the collimation distance measuring unit 4 with respect to gravity based on the signal transmitted by the inclinometer 49. Step S18 corresponds to an example of "calculating a coordinate value of a measurement center of the collimation distance measuring unit" in the three-dimensional surveying method of the invention.

Subsequently, in Step S19, the computation section 461 calculates the azimuth in the direction from the collimation distance measuring unit 4 to the measurement target 6 based on the exterior orientation element of the collimation distance measuring unit 4 with respect to the mobile body 3 and the horizontal angle detected by the first horizontal angle detector 434. That is, based on the signal transmitted from the azimuth sensor 32 of the mobile body 3, the computation section 461 calculates the azimuth of the mobile body 3 and calculates the azimuth of the collimation distance measuring unit 4.

Subsequently, in Step S20, the computation section 461 calculates the coordinate value (position) of the measurement center of the collimation distance measuring unit 4 based on the distance (the first distance), the vertical angle (the first vertical angle), and the horizontal angle (the first horizontal angle) acquired in Step S18, the inclination angle, the exterior orientation element of the collimation distance measuring unit 4 with respect to the mobile body 3, and the azimuth calculated in Step S19. At this time, the coordinate value of the measurement center of the collimation distance measuring unit 4 calculated by the computation section 461 is a coordinate value in the global coordinate system. Step S20 corresponds to an example of "calculating a coordinate value of a measurement center of the collimation distance measuring unit" in the three-dimensional surveying method of the invention.

Subsequently, in Step S21, the computation section 461 calculates the coordinate value (the position) of the measurement point of the measurement target object 7 based on the distance from the scanner unit 5 to the measurement target object 7, the vertical angle detected by the second vertical angle detector 544, the horizontal angle detected by the second horizontal angle detector 534, the exterior orientation element of the scanner unit 5 with respect to the collimation distance measuring unit 4, the coordinate value (the position) of the measurement center of the collimation distance measuring unit 4 at the time when the light emitting element 561 emitted the second distance measuring light 565 (the scan light emitting time), the azimuth of the collimation distance measuring unit 4, and the inclination (the inclination angle) of the collimation distance measuring unit 4. That is, the computation section 461 calculates the coordinate value (the position) of the measurement point of the measurement target object 7 based on the distance (the second distance), the vertical angle (the second vertical angle) and the horizontal angle (the second horizontal angle) acquired in Step S18, the exterior orientation element of the scanner unit 5 with respect to the collimation distance measuring unit 4, the coordinate value (the position) of the collimation distance measuring unit 4 at the scan light emitting time, the azimuth, and the inclination angle. At this time, the coordinate value of the measurement point of the measurement target object 7 calculated by the computation section 461 is a coordinate value in the global coordinate system. Step S21 corresponds to an example "calculating a coordinate value of the measurement target object" in the three-dimensional surveying method of the invention.

According to the three-dimensional surveying device 2 and the three-dimensional surveying method of the present embodiment, the collimation distance measuring unit 4 is fixed to the mobile body 3. In addition, the scanner unit 5 is provided integrally with the collimation distance measuring unit 4, and is provided rotatably with respect to the collimation distance measuring unit 4. That is, the collimation distance measuring unit 4 and the scanner unit 5 are integrally fixed to the mobile body 3, and move together with the mobile body 3. For this reason, for example, a wireless communication modem or the like configured to wirelessly transmit and receive signals (information) with each other between the collimation distance measuring unit 4 and the scanner unit 5 is unnecessary. In this way, the three-dimensional surveying device 2 can suppress the number of devices and equipment provided in the three-dimensional surveying device 2, and can simplify the structure of the three-dimensional surveying device 2. In addition, it is possible to suppress the complexity of the settings of the devices and equipment provided in the three-dimensional surveying device 2.

In addition, the scanner unit 5 is provided integrally with the collimation distance measuring unit 4, and is provided rotatably with respect to the collimation distance measuring unit 4. For this reason, even in cases where the attitude of the mobile body 3 changes, the collimation distance measuring unit 4 can more reliably collimate the measurement target 6 and calculate the coordinate value of the measurement center of the collimation distance measuring unit 4, and the scanner unit 5 can rotate with respect to the collimation distance measuring unit 4 and scan the measurement target object 7 in a desired direction. In this way, the three-dimensional surveying device 2 suppresses the occurrence of measurement errors, and can stably acquire high-accuracy three-dimensional data.

In addition, in Step S15, the computation section 461 executes control to perform rotational radiation of the second distance measuring light 565 by the scanning mirror 55 in a plane perpendicular to the movement direction of the mobile body 3. Accordingly, in cases where the measurement target object 7 has a shape or structure that extends in the longitudinal direction, such as a tunnel, for example, the scanner unit 5 rotationally radiates the second distance measuring light 565 in a plane perpendicular to the longitudinal direction (the movement direction of the mobile body 3) and can stably acquire three-dimensional data with high accuracy.

In addition, the computation section 461 calculates the coordinate value of the measurement center of the collimation distance measuring unit 4 and the coordinate value of the measurement point of the measurement target object 7 based on the azimuth detected by the azimuth sensor 32 and the inclination angle of the collimation distance measuring unit 4 measured by the inclinometer 49. For this reason, the three-dimensional surveying device 2 can acquire the coordinate value (the position) of the collimation distance measuring unit 4 and the coordinate value (the position) of the measurement target object 7 in the global coordinate system.

The embodiments of the invention have been described above. However, the invention is not limited to the above embodiments, and various modifications can be made without departing from the scope of the claims. Parts of the configurations of the above embodiments can be omitted or arbitrarily combined in ways different from the above.

REFERENCE SIGNS LIST

2 Three-dimensional surveying device
3 Mobile body
4 Collimation distance measuring unit
5 Scanner unit
6 Measurement target
7 Measurement target object
31 Wheel
32 Azimuth sensor
41 Leveling section
42 First mount section
43 First horizontal rotating section
44 First vertical rotating section
45 Telescope section
46 Control computation section
47 Operation display section
48 Base section
49 Inclinometer
52 Second mount section
53 Second horizontal rotating section
54 Second vertical rotating section
55 Scanning mirror
56 Second distance measuring light emitting section
57 Second distance measuring light receiving section
411 Adjusting screw
421 Gap section
431 First horizontal rotation shaft
432 Shaft bearing
433 First horizontal drive motor
434 First horizontal angle detector 436 First vertical axial center
441 First vertical rotation shaft
442 Shaft bearing
443 First vertical drive motor
444 First vertical angle detector
446 First horizontal axial center
451 First distance measuring light emitting section
452 First distance measuring light receiving section
453 Collimation light receiving section
455 First distance measuring light
456 First reflected distance measuring light
457 Reflected collimation light
458 Collimator
461 Computation section
462 First distance measurement section
463 First horizontal rotational driving section
464 First vertical rotational driving section
465 Second distance measurement section
466 Second horizontal rotational driving section
467 Second vertical rotation driving section
468 Storage section
469 Image processing section
471 Display section
472 Operation input section
521 Recess portion
531 Second horizontal rotation shaft
532 Shaft bearing
533 Second horizontal drive motor
534 Second horizontal angle detector
536 Second vertical axial center
541 Second vertical rotation shaft
542 Shaft bearing
543 Second vertical drive motor
544 Second vertical angle detector
546 Second horizontal axial center
561 Light emitting element
562 Projection light optical section
565 Second distance measuring light
566 Second reflected distance measuring light
571 Light receiving element
572 Receiving light optical section

What is claimed is:

1. A three-dimensional surveying device configured to acquire three-dimensional data for a measurement target object, the three-dimensional surveying device comprising:
   a mobile body;
   a measurement target installed at a known point separate from the mobile body;
   a collimation distance measuring unit fixed to the mobile body and configured to radiate a first distance measuring light to the measurement target, measure a distance to the measurement target based on a first reflected distance measuring light resulting from the first distance measuring light being reflected by the measurement target and a first internal reference light, and detect a radiation direction of the first distance measuring light;
   a scanner unit provided integrally with the collimation distance measuring unit and provided rotatably with respect to the collimation distance measuring unit, the scanner unit configured to radiate a second distance measuring light to the measurement target object, measure a distance to the measurement target object based on a second reflected distance measuring light resulting from the second distance measuring light being reflected by the measurement target object and a second internal reference light, and detect a radiation direction of the second distance measuring light; and
   a control computation section provided in at least one of the collimation distance measuring unit or the scanner unit,
   wherein the collimation distance measuring unit includes:
      a telescope section configured to collimate the measurement target and radiate the first distance measuring light,
      a first horizontal drive motor configured to horizontally rotate the telescope section about a vertical axial center,
      a first horizontal angle detector configured to detect a first horizontal angle of the telescope section,
      a first vertical drive motor configured to vertically rotate the telescope section about a horizontal axial center, and
      a first vertical angle detector configured to detect a first vertical angle of the telescope section;
   the scanner unit includes:
      a scanning mirror configured to perform rotational radiation of the second distance measuring light within a plane intersecting a horizontal axial center,
      a second horizontal drive motor configured to horizontally rotate the scanning mirror about a vertical axial center,
      a second horizontal angle detector configured to detect a second horizontal angle of the scanning mirror,
      a second vertical drive motor configured to vertically rotate the scanning mirror about a horizontal axial center, and
      a second vertical angle detector configured to detect a second vertical angle of the scanning mirror,
   the control computation section includes:
      a first distance measurement section configured to measure a distance from the collimation distance measuring unit to the measurement target, and
      a second distance measurement section configured to measure a distance from the scanner unit to the measurement target object; and
   the control computation section is configured to:
      calculate a coordinate value of a measurement center of the collimation distance measuring unit based on the distance measured by the first distance measurement section, the first horizontal angle detected by the first horizontal angle detector, and the first vertical angle detected by the first vertical angle detector, and
      calculate a coordinate value of the measurement target object based on the coordinate value of the measurement center, an external orientation element of the scanner unit with respect to the collimation distance measuring unit, the distance measured by the second distance measurement section, the second horizontal angle detected by the second horizontal angle detector, and the second vertical angle detected by the second vertical angle detector.

2. The three-dimensional surveying device according to claim 1,
   wherein the control computation section is configured to control the second horizontal drive motor and the second vertical drive motor to cause the second distance measuring light to be rotationally radiated by the scanning mirror within a plane perpendicular to a movement direction of the mobile body.

3. The three-dimensional surveying device according to claim 1, wherein the mobile body includes an azimuth sensor configured to detect an azimuth, the collimation distance measuring unit includes an inclinometer configured to measure an inclination with respect to gravity, and the control computation section is configured to calculate the coordinate value of the measurement center further based on the azimuth detected by the azimuth sensor, an external orientation element of the collimation distance measuring unit with respect to the mobile body, and an inclination angle of the collimation distance measuring unit measured by the inclinometer, and to calculate the coordinate value of the measurement target object further based on the azimuth detected by the azimuth sensor and the inclination angle of the collimation distance measuring unit measured by the inclinometer.

4. A three-dimensional surveying method to be executed by a three-dimensional surveying device configured to acquire three-dimensional data for a measurement target object, the three-dimensional surveying method comprising:

calculating a coordinate value of a measurement center of a collimation distance measuring unit fixed to a mobile body based on a distance measured by a first distance measurement unit configured to collimate a measurement target installed at a known point separate from the mobile body and radiate a first distance measuring light to measure a distance to the measurement target, a first horizontal angle of a telescope section in rotating the telescope section horizontally about a vertical axial center, and a first vertical angle of the telescope section in rotating the telescope section vertically about a horizontal axial center; and calculating a coordinate value of the measurement target object based on the coordinate value of the measurement center, an external orientation element of a scanner unit with respect to the collimation distance measuring unit, wherein the scanner unit is provided integrally with the collimation distance measuring unit and provided rotatably with respect to the collimation distance measuring unit, a distance measured by a second distance measurement section configured to radiate a second distance measuring light to measure a distance to the measurement target object, a second horizontal angle of a scanning mirror configured to perform rotational radiation of the second distance measuring light within a plane intersecting a horizontal axial center in rotating the scanning mirror horizontally about a vertical axial center, and a second vertical angle of the scanning mirror in rotating the scanning mirror vertically about a horizontal axial center.

* * * * *